United States Patent
Enomoto

(10) Patent No.: US 11,149,737 B2
(45) Date of Patent: Oct. 19, 2021

(54) DEPOSITION DETECTION DEVICE FOR EXHAUST PUMP AND EXHAUST PUMP HAVING THE SAME

(75) Inventor: Yoshihiro Enomoto, Chiba (JP)

(73) Assignee: Edwards Japan Limited, Yachiyo (JP)

( * ) Notice: Subject to any disclaimer, the term of this patent is extended or adjusted under 35 U.S.C. 154(b) by 721 days.

(21) Appl. No.: 13/696,749

(22) PCT Filed: Apr. 27, 2011

(86) PCT No.: PCT/JP2011/060254
§ 371 (c)(1),
(2), (4) Date: Nov. 7, 2012

(87) PCT Pub. No.: WO2011/145444
PCT Pub. Date: Nov. 24, 2011

(65) Prior Publication Data
US 2013/0071258 A1 Mar. 21, 2013

(30) Foreign Application Priority Data

May 21, 2010 (JP) .............................. JP2010-117302
Apr. 27, 2011 (WO) .................. PCT/JP2011/060254

(51) Int. Cl.
*F04D 27/00* (2006.01)
*F04B 49/10* (2006.01)
(Continued)

(52) U.S. Cl.
CPC ............ *F04D 27/001* (2013.01); *F04B 49/10* (2013.01); *F04B 51/00* (2013.01); *F04D 19/04* (2013.01);
(Continued)

(58) Field of Classification Search
CPC ........ F04B 49/06; F04B 49/10; F04B 49/103; F04B 51/00; F04D 27/001; F04D 19/04;
(Continued)

(56) References Cited

U.S. PATENT DOCUMENTS 5,166,566 A * 11/1992 Bernhardt ........... F16C 32/0425
310/90
5,961,291 A 10/1999 Seiji et al.
(Continued)

FOREIGN PATENT DOCUMENTS

CN 1968639 A 5/2007
JP 2003232292 A 8/2003
(Continued)

OTHER PUBLICATIONS

Savitsky et al. "Smoothing and Differentiation of Data by Simplified Least Squares Procedures," Anal. Chem., 1964, 36 (8), pp. 1627-1639.*

(Continued)

*Primary Examiner* — Catherine T. Rastovski
*Assistant Examiner* — Liam R Casey
(74) *Attorney, Agent, or Firm* — Shumaker & Sieffert, P.A.

(57) ABSTRACT

To provide a deposit detection device capable of detecting with accuracy and alarming deposits deposited in an exhaust pump used for various processes regardless of kinds and flow rate of process gas, and to provide an exhaust pump equipped with the deposit detection device.

A pump control device 50 of an exhaust pump P comprises a deposit detection device which executes, as initial process, steps of reading electric current value of a motor for rotating a rotor and obtaining and storing an initial electric current value of the motor based on the electric current values read; and then executes, as next process, steps of reading the electric current value of the motor, obtaining a current value of the motor based on the electric current values read, and obtaining quantity of fluctuation of the current value of the electric current value of the motor relative to the initial value (Continued)

of the electric current value of the motor, thereby detecting the deposit in the pump based on the quantity of fluctuation.

18 Claims, 12 Drawing Sheets

(51) Int. Cl.
  *F04B 51/00* (2006.01)
  *F04D 19/04* (2006.01)
(52) U.S. Cl.
  CPC .... *F05D 2260/607* (2013.01); *F05D 2260/80* (2013.01); *F05D 2270/303* (2013.01); *F05D 2270/335* (2013.01); *Y02T 50/60* (2013.01)
(58) Field of Classification Search
  CPC ........... F05D 2260/607; F05D 2260/80; F05D 2270/303; F05D 2270/305
  See application file for complete search history.

(56) References Cited

U.S. PATENT DOCUMENTS

| | | | | |
|---|---|---|---|---|
| 6,023,401 A | * | 2/2000 | Hashimoto | F01N 9/00 361/93.1 |
| 6,416,290 B1 | * | 7/2002 | Yamauchi | 417/32 |
| 7,543,492 B2 | * | 6/2009 | Becourt | F04B 37/14 702/181 |
| 2001/0051108 A1 | * | 12/2001 | Schonauer | G01N 25/22 422/68.1 |
| 2002/0144706 A1 | * | 10/2002 | Davis | C23C 16/4405 134/1.1 |
| 2003/0154052 A1 | | 8/2003 | Samata et al. | |
| 2005/0107984 A1 | * | 5/2005 | Samata | F04C 18/18 702/183 |
| 2006/0162438 A1 | * | 7/2006 | Schofield | F04B 51/00 73/168 |
| 2007/0172361 A1 | * | 7/2007 | Manson et al. | 417/53 |
| 2009/0035151 A1 | * | 2/2009 | Sugiura | F04B 51/00 417/44.11 |
| 2010/0248397 A1 | * | 9/2010 | Newman | H01L 21/67115 438/14 |
| 2011/0121767 A1 | * | 5/2011 | Nomura | F04B 49/06 318/376 |

FOREIGN PATENT DOCUMENTS

| | | |
|---|---|---|
| JP | 2004117091 A | 4/2004 |
| JP | 3550465 B2 | 8/2004 |
| JP | 2005105846 A | 4/2005 |
| WO | 2006109861 A1 | 10/2006 |
| WO | 2010007975 A1 | 1/2010 |
| WO | WO 2010016176 A1 * | 2/2010 ............. F04B 49/06 |

OTHER PUBLICATIONS

Communication pursuant to Rule 164(1) EPC dated Jan. 10, 2018, from counterpart International Application No. PCT/JP2011/060254, 6 pp.

* cited by examiner

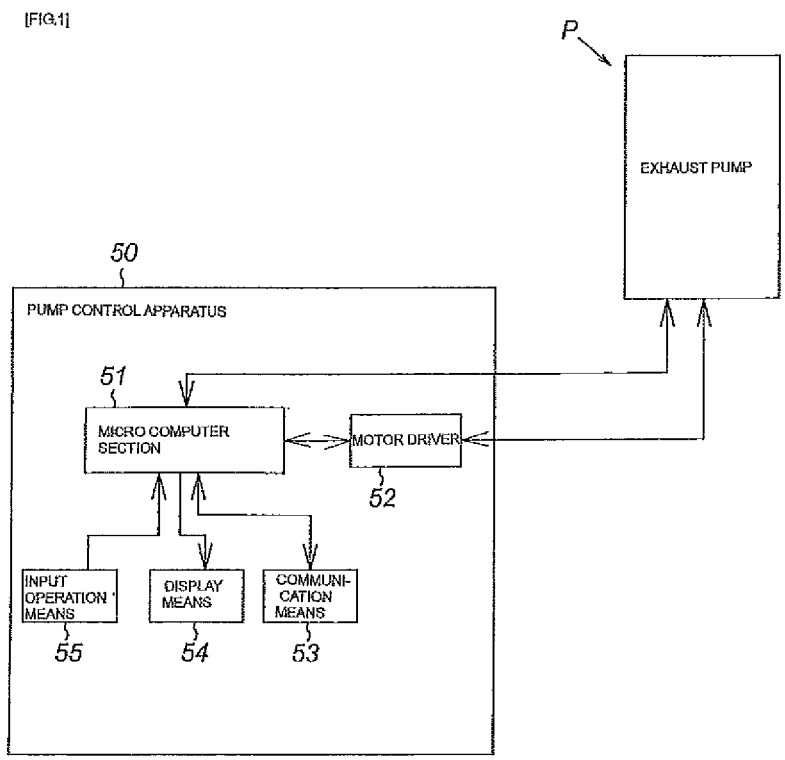

[FIG.2]
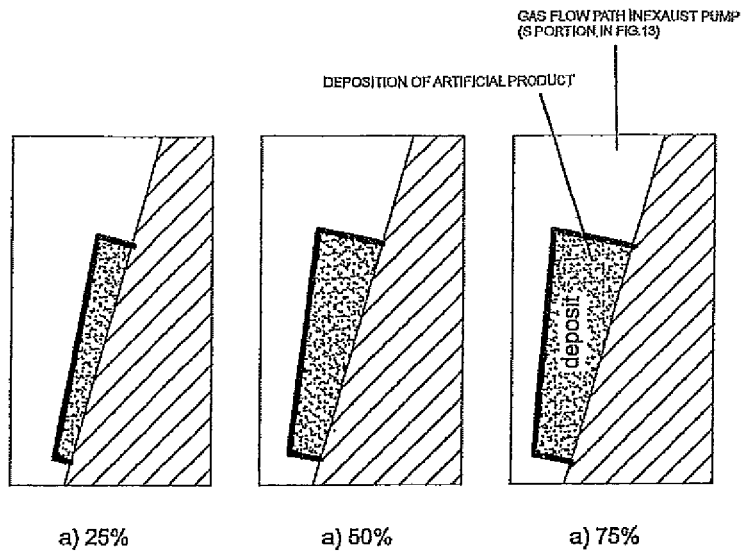
a) 25%   a) 50%   a) 75%
EXPLANATORY VIEW OF ARTIFICIAL PRODUCTION DEPOSITION
[FIG.3]
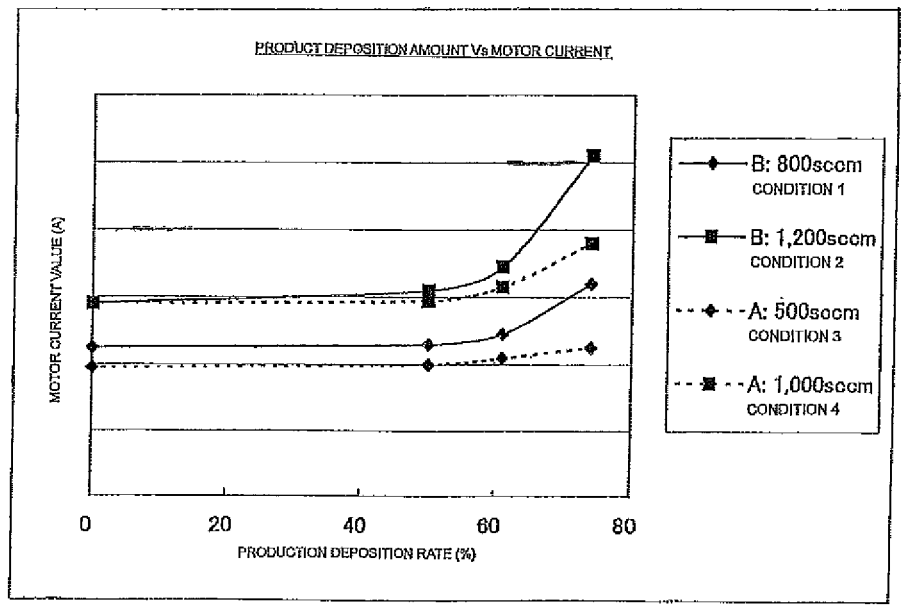
NOTE 1) GRADUATION OF VERTICAL LINE IS 2.0A
NOTE 2) A, B SHOW DIFFERENT KINDS OF GAS

[FIG.4]
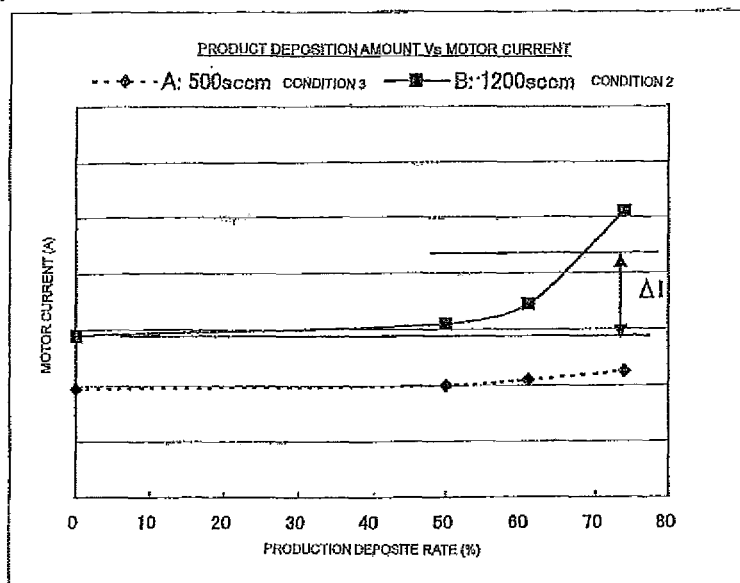
NOTE 1) GRADUATION OF VERTICAL LINE IS 2.0A
NOTE 2) A, B SHOW DIFFERENT KINDS OF GAS
[FIG.5]
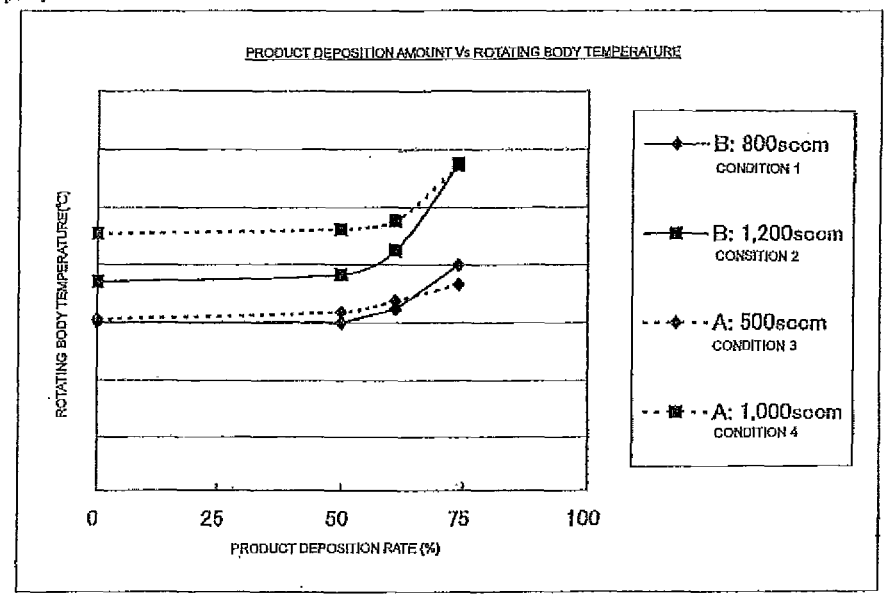
NOTE 1) GRADUATION OF VERTICAL LINE IS 10℃
NOTE 2) A, B SHOW DIFFERENT KINDS OF GAS

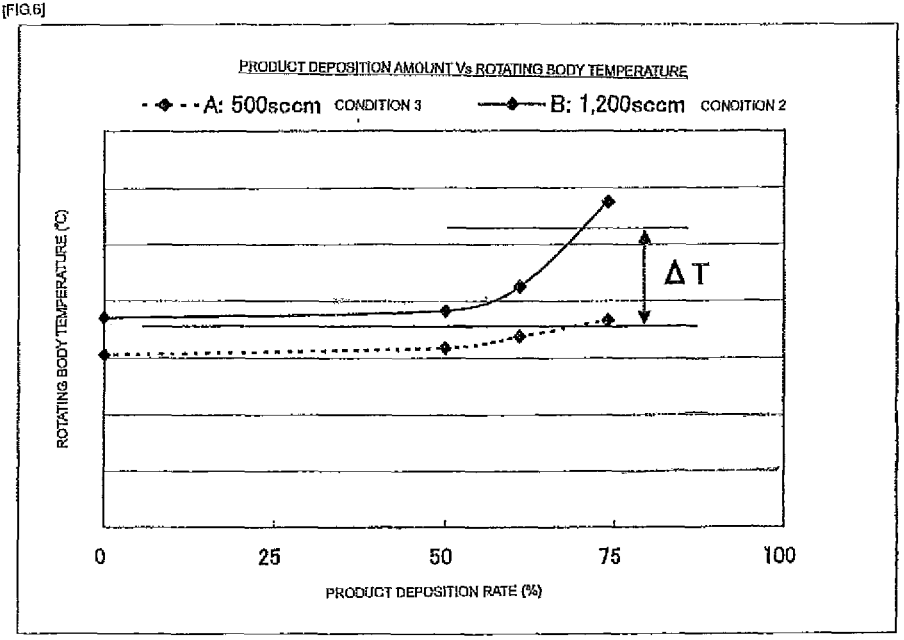

FIG.10
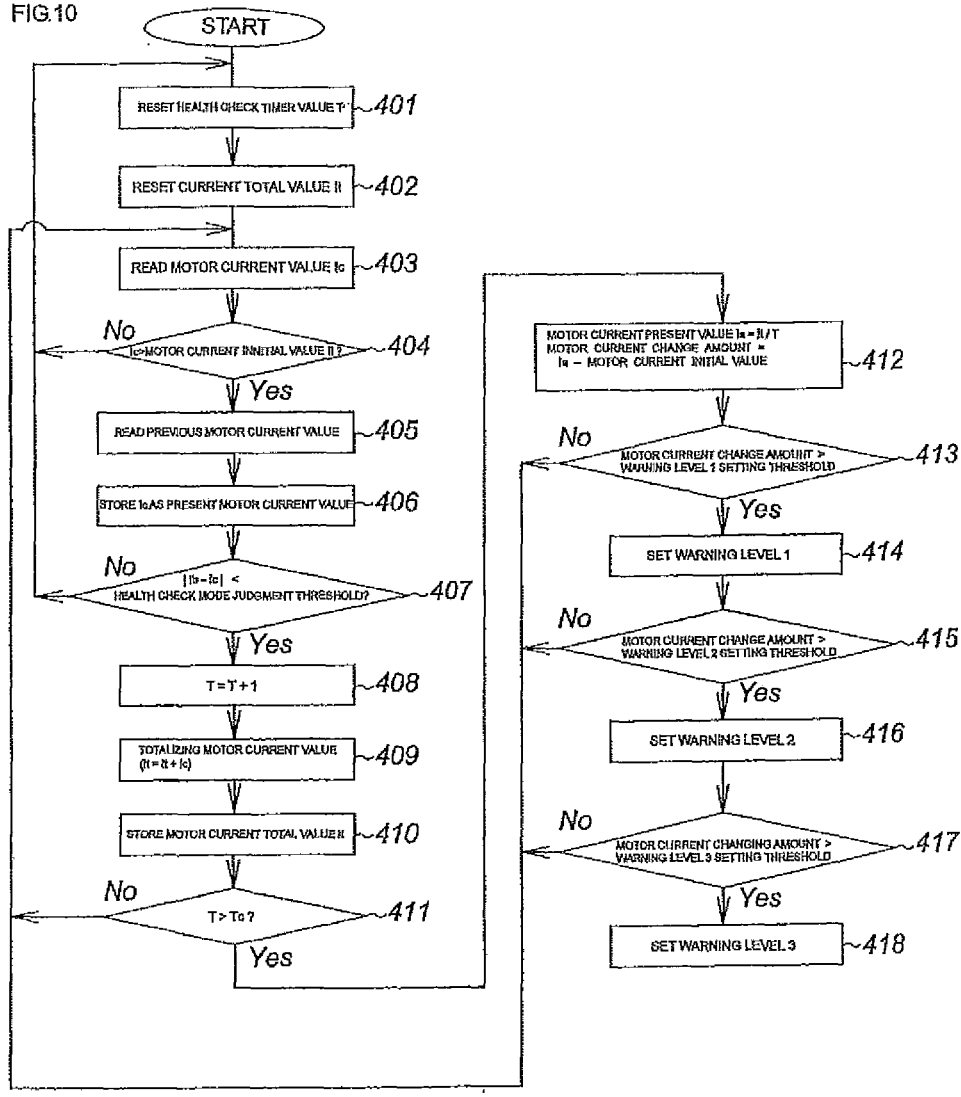
[FIG.11]
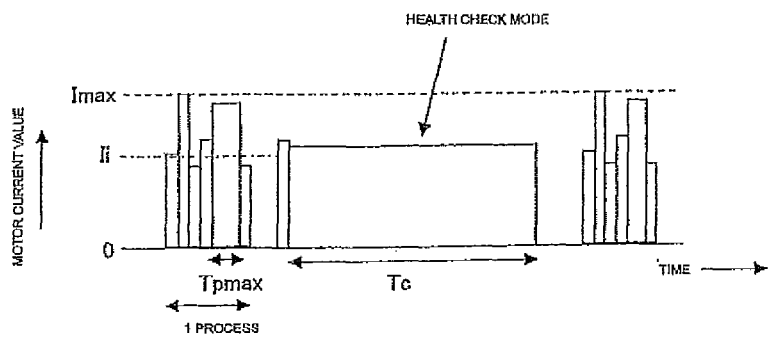

[FIG.12]
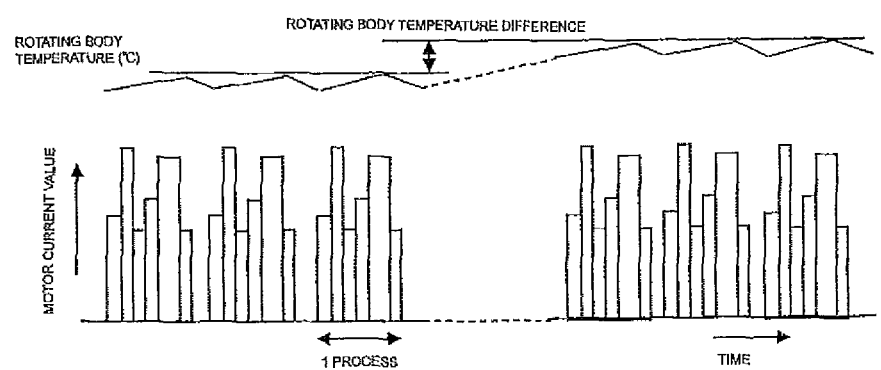

[FIG.13]
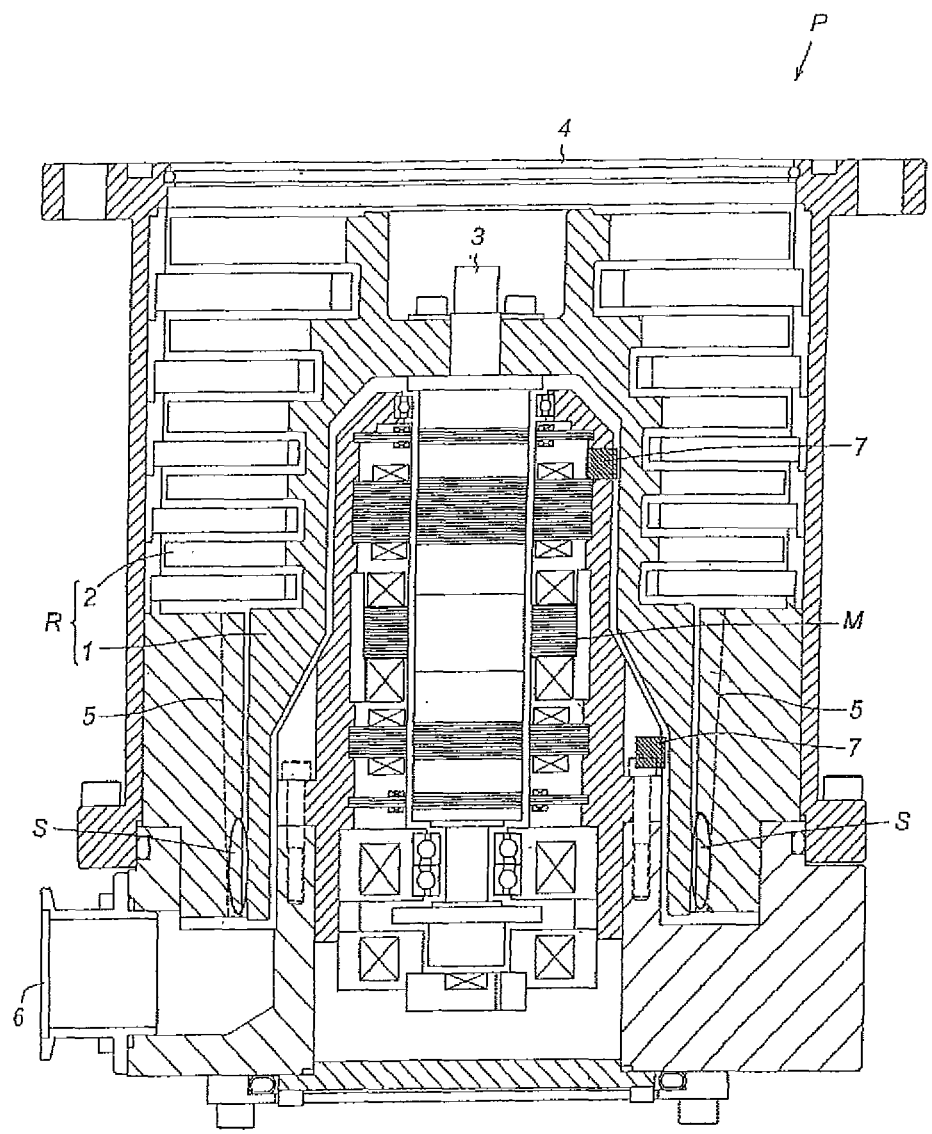

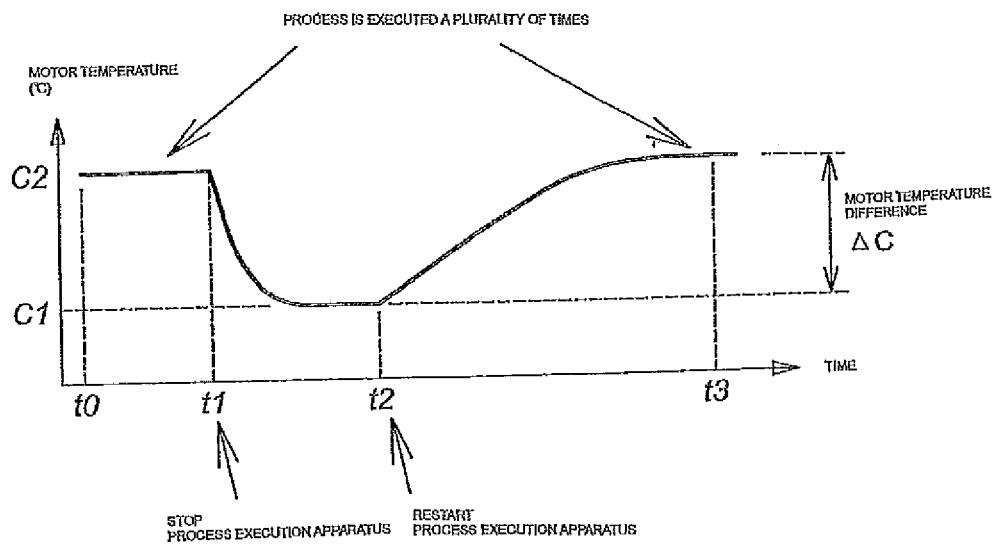
[FIG.14]
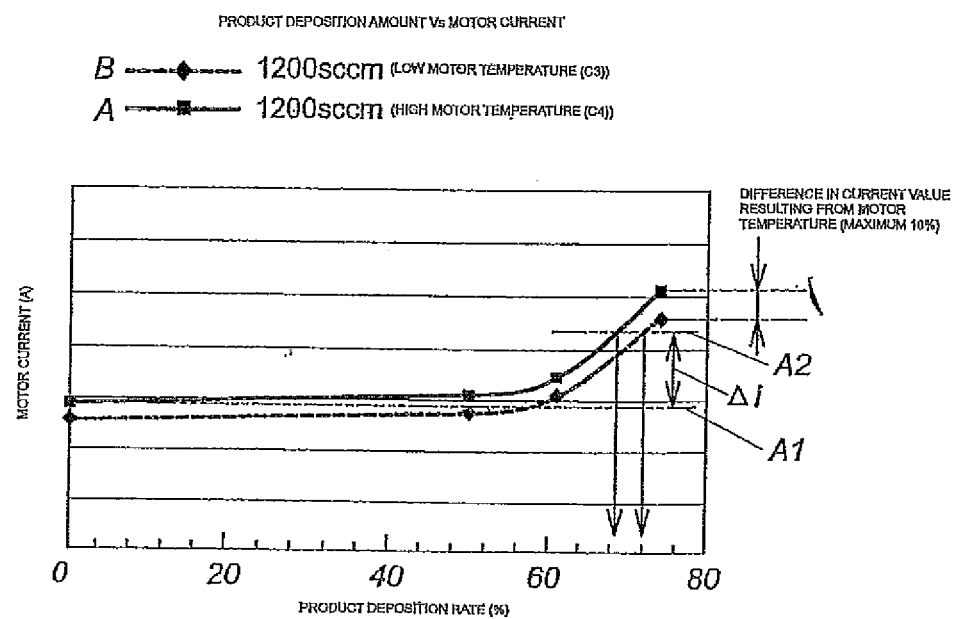
[FIG.15]

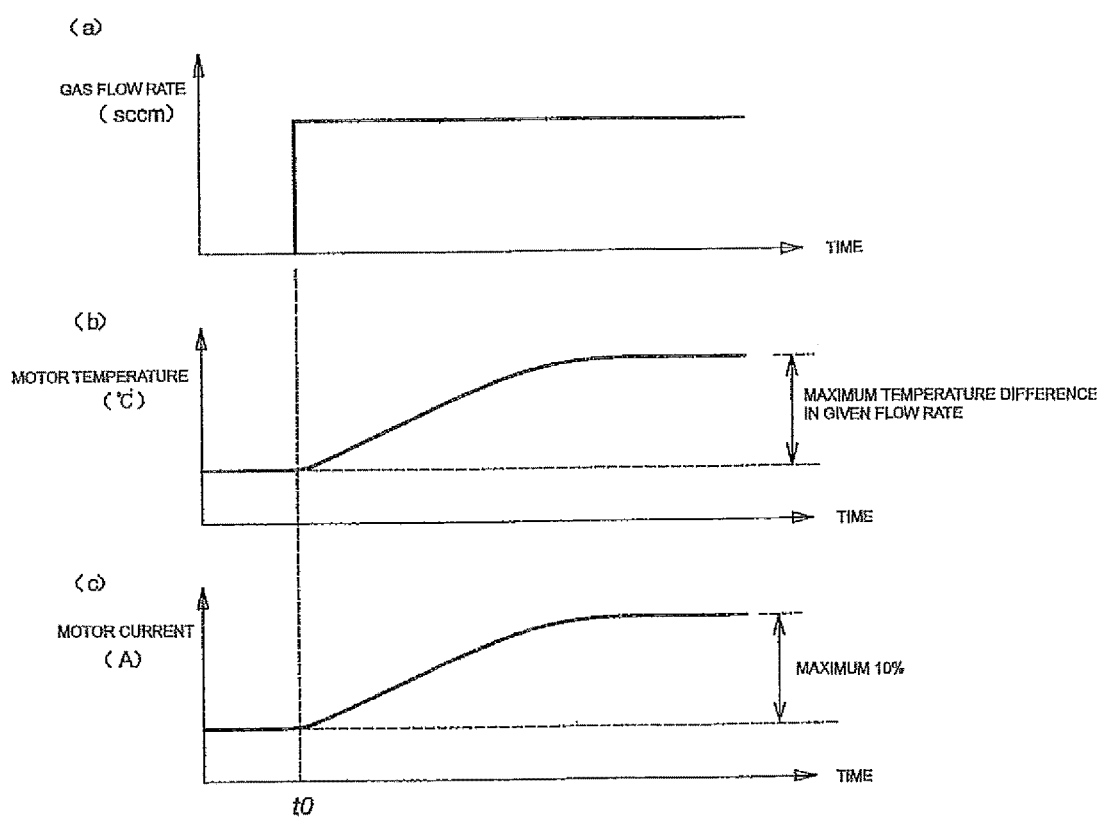

DEPOSITION DETECTION DEVICE FOR EXHAUST PUMP AND EXHAUST PUMP HAVING THE SAME

BACKGROUND OF THE INVENTION

1. Field of the Invention

The present invention relates to a deposition detection device for detecting a product deposited in a pump (a deposition in an exhaust pump) and an exhaust pump having such a deposition detection device, and particularly relates to a deposition detection device capable of more accurately detecting, in any process irrespective of the type or flow rate of gas used in a process such as etching, a deposition in a pump (a deposition in an exhaust pump) used in the process and issuing a warning, and an exhaust pump having such a deposition detection device.

2. Description of the Related Art

In a semiconductor manufacturing apparatus, as means for exhausting gas emitted from a device for a process such as etching or the like to the outside, there is used, e.g., an exhaust pump P shown in FIG. 13. The exhaust pump P has a rotating body R formed of a cylindrical section 1 and a blade section 2, and the rotating body R is rotationally driven about a rotor shaft 3 by a motor M. With the arrangement, a molecule of gas position on an air inlet 4 side of the exhaust pump P is transferred to the upstream of a thread groove section 5 by being given a downward movement amount by the rotating blade section 2, compressed in the thread groove section 5, and discharged to the outside through an air outlet 6.

It is known that a product is deposited in an exhaust pump such as a turbo-molecular pump or the like by the exhausting of the gas described above (see, e.g., Paragraph 0014 of Japanese Patent Application Laid-open No. 2003-232292). In particular, in the exhaust pump of FIG. 13, the product tends to be deposited in S portions in the drawing. Japanese Patent Application Laid-open No. 2003-232292 discloses a method for detecting the product deposited in the pump (a deposition in an exhaust pump). The disclosed deposition detection method is a method in which, in a turbo-molecular pump (20), a current value of a motor (7) for rotating a rotary vane (23) is detected, the detected current value of the motor is compared with a predetermined set current value and, as a result, when the detected current value of the motor is higher than the predetermined set current value by a specific value or more, a warning is issued (see, e.g., Paragraph 0022 and the like of Japanese Patent Application Laid-open No. 2003-232292).

However, an end user of the exhaust pump including the turbo-molecular pump (20) of Japanese Patent Application Laid-open No. 2003-232292 uses the exhaust pump in various processes, and the type and the flow rate of gas flowing in the exhaust pump vary in accordance with the content of the processes. The current value of the motor for rotationally driving the rotating body of the exhaust pump also changes in accordance with the type and the flow rate of the gas flowing in the exhaust pump.

Consequently, in the above-described deposition detection method disclosed in Japanese Patent Application Laid-open No. 2003-232292, since the deposition of the product is detected based on the predetermined set current value and the warning is issued, there is a problem that it is not possible to accurately detect the deposition and issue the warning in a process that is not based on the set current value. In addition, in order to avoid erroneous detection or erroneous issuing of the warning, after the use situation of the exhaust pump such as the flow rate and the type of the gas used in the process in which the exhaust pump is used is examined in detail, the set current value needs to be changed in accordance with the use situation so that a problem arises that it is time-consuming and costly to examine the use situation and change the set current value.

The reference numerals in parentheses in the above description are reference numerals used in Japanese Patent Application Laid-open No. 2003-232292

SUMMARY OF THE INVENTION

The present invention has been achieved in order to solve the problem described above, and an object thereof is to provide a deposition detection device capable of more accurately detecting, in any process irrespective of the type or the flow rate of gas used in the process, a deposition in a pump (deposition in an exhaust pump) used in the process, and an exhaust pump having such a device.

In order to achieve the above-described object, a first aspect of the present invention is a deposition detection device for an exhaust pump for exhausting gas by a rotational movement of a rotating body, the deposition detection device including a function of executing, as an initial process, a process for reading a current value of a motor for rotationally driving the rotating body and a process for determining a motor current initial value based on the read current value of the motor and storing the determined motor current initial value, and a function of executing, as a subsequent process after the initial process, a process for reading the current value of the motor, a process for determining a motor current present value based on the read current value of the motor, and a process for determining an amount of change to the motor current present value from the motor current initial value, wherein the deposition detection device detects a deposition in the exhaust pump based on the change amount.

The subsequent process in the first aspect of the present invention can further include a process for performing setting of warning based on the amount of change (the amount of change to the motor current present value from the motor current initial value).

The setting of warning in this case may set a warning level in stages in accordance with the amount of change (the amount of change to the motor current present value from the motor current initial value).

In the subsequent process in the first aspect of the present invention, after the gas of a specified type and a specified flow rate is flowed into the pump, a temperature of the motor may be measured at a stage where the current value of the motor is read, a motor current attained value may be predicted based on the measured temperature of the motor, and the predicted motor current attained value may be adopted as the motor current present value.

In the initial process in the first aspect of the present invention, after the gas of a specified type and a specified flow rate is flowed into the pump, a temperature of the motor may be measured at a stage where the current value of the motor is read, a motor current attained value may be predicted based on the measured temperature of the motor, and the predicted motor current attained value may be adopted and stored as the motor current initial value.

A second aspect of the present invention is a deposition detection device for an exhaust pump for exhausting gas by a rotational movement of a rotating body, the deposition detection device including a function of executing, as an initial process, a process for reading the temperature of the rotating body and a process for determining the rotating body temperature initial value based on the read temperature of the rotating body and storing the determined rotating body temperature initial value, and a function of executing, as a subsequent process after the initial process, a process for reading the temperature of the rotating body, a process for determining a rotating body temperature present value based on the read temperature of the rotating body, and a process for determining an amount of change to the rotating body temperature present value from the rotating body temperature initial value, wherein the deposition detection device detects a deposition in the exhaust pump based on the amount of change.

The subsequent process in the second aspect of the present invention can further include a process for performing setting of warning based on the amount of change (the amount of change to the rotating body temperature present value from the rotating body temperature initial value).

The setting of warning in this case may set a warning level in stages in accordance with the amount of change (the amount of change to the rotating body temperature present value from the rotating body temperature initial value).

A third aspect of the present invention is a deposition detection device for an exhaust pump for exhausting gas by a rotational movement of a rotating body, the deposition detection device including a function of executing, as an initial process, a process for reading a current value of a motor for rotationally driving the rotating body, a process for determining a motor current initial value based on the read current value of the motor and storing the determined motor current initial value, a process for reading the temperature of the rotating body, and a process for determining a rotating body temperature initial value based on the read temperature of the rotating body and storing the determined rotating body temperature initial value, and a function of executing, as a subsequent process after the initial process, a process for reading the current value of the motor, a process for determining a motor current present value based on the read current value of the motor, a process for determining an amount of change to the motor current present value from the motor current initial value, a process for reading the temperature of the rotating body, a process for determining a rotating body temperature present value based on the read temperature of the rotating body, and a process for determining an amount of change to the rotating body temperature present value from the rotating body temperature initial value, wherein the deposition detection device detects a deposition in the exhaust pump based on the two amounts of change.

The subsequent process in the third aspect of the present invention can further include a process for performing setting of warning based on the two amounts of change (the amount of change to the motor current present value from the motor current initial value and the amount of change to the rotating body temperature present value from the rotating body temperature initial value).

The setting of warning in this case may set a warning level in stages in accordance with the two amounts of change (the amount of change to the motor current present value from the motor current initial value and the amount of change to the rotating body temperature present value from the rotating body temperature initial value).

In a case where the warning level is set in stages in the third aspect of the present invention, in the setting of warning, when the amount of change to the motor current present value from the motor current initial value is not less than a current-related maximum warning setting threshold or when the amount of change to the rotating body temperature present value from the rotating body temperature initial value is not less than a temperature-related maximum warning setting threshold, the setting of warning corresponding to each of the thresholds may be performed and, when the amount of change to the motor current present value from the motor current initial value is not less than a current-related initial warning setting threshold and the amount of change to the rotating body temperature present value from the rotating body temperature initial value is not less than a temperature-related initial warning setting threshold, the setting of warning corresponding to the current-related or temperature-related initial warning setting threshold may be performed.

In the subsequent process in the third aspect of the present invention, after the gas of a specified type and a specified flow rate is flowed into the pump, a temperature of the motor may be measured at a stage where the current value of the motor is read, a motor current attained value may be predicted based on the measured temperature of the motor, and the predicted motor current attained value may be adopted as the motor current present value.

In the initial process in the third aspect of the present invention, after the gas of a specified type and a specified flow rate is flowed into the pump, a temperature of the motor may be measured at a stage where the current value of the motor is read, a motor current attained value may be predicted based on the measured temperature of the motor, and the predicted motor current attained value may be adopted and stored as the motor current initial value.

According to the first aspect of the present invention, the configuration is adopted in which the motor current initial value is determined in the initial process, the motor current present value is determined in the subsequent process, the amount of change to the motor current present value from the motor current initial value is further determined, and the deposition in the exhaust pump is detected based on the amount of change. As a result, for example, the initial process is performed during the execution of a process immediately after an end user incorporates the exhaust pump in a process execution apparatus, whereby the change amount of the motor current based on the actual process is obtained and the detection of the deposition in the exhaust pump is performed based on the amount of change, and hence there is obtained an operational advantage that, in any process irrespective of the type or the flow rate of gas used in the process, it is possible to more accurately detect the deposition in the pump (the deposition in the exhaust pump) used in the process and issue a warning.

According to the second aspect of the present invention, the configuration is adopted in which the rotating body temperature initial value is determined in the initial process, the rotating body temperature present value is determined in the subsequent process, the amount of change to the rotating body temperature present value from the rotating body temperature initial value is further determined, and the deposition in the exhaust pump is detected based on the amount of change. As a result, for example, the initial process is performed during the execution of the process immediately after the end user incorporates the exhaust pump in the process execution apparatus, whereby the amount of change in the temperature of the rotating body based on the actual process is obtained and the detection of the deposition in the exhaust pump is performed based on the amount of change, and hence there is obtained the operational advantage that, in any process irrespective of the type or the flow rate of gas used in the process, it is possible to more accurately detect the deposition in the pump (the deposition in the exhaust pump) used in the process and issue the warning.

According to the third aspect of the present invention, the deposition in the exhaust pump is detected based on the amount of change to the motor current present value from the motor current initial value and the amount of change to the rotating body temperature present value from the rotating body temperature initial value, and hence it is possible to more accurately detect the deposition in the exhaust pump and issue the warning.

BRIEF DESCRIPTION OF THE DRAWINGS

FIG. 1 is a functional block diagram of an example where a deposition detection device as an embodiment of the present invention is incorporated in a pump control apparatus of an exhaust pump of FIG. 13;

FIG. 2 is an explanatory view of a state where a deposition state of a product in a gas flow path in the exhaust pump of FIG. 13 is artificially created, of which FIG. 2A shows a state where a product deposition rate is 25%, FIG. 2B shows a state where the product deposition rate is 50%, and FIG. 2C shows a state where the product deposition rate is 75%;

FIG. 3 is an explanatory view of the relationship between the product deposition rate and a motor current when the exhaust pump of FIG. 13 is operated in the situation where the artificial deposition of FIG. 2 is present and a motor current of the exhaust pump is measured;

FIG. 4 is a view in which the relationships between the product deposition rate and the motor current when the exhaust pump of FIG. 13 is operated on each of Condition 2 and Condition 3 of FIG. 3 and a motor current of the exhaust pump is measured are compared with each other;

FIG. 5 is an explanatory view of the relationship between the product deposition rate and a temperature of the rotating body when the exhaust pump is operated in the situation where the artificial deposition of FIG. 2 is present and the temperature of a rotating body (specifically a blade section) of the exhaust pump is measured;

FIG. 6 is a view in which the relationships between the product deposition rate and the temperature of the rotating body when the exhaust pump is operated on each of Condition 2 and Condition 3 of FIG. 5 and the temperature of the rotating body (specifically the blade section) of the exhaust pump is measured are compared with each other;

FIG. 10 is a flowchart showing the flow of a subsequent process in a case where the above-described setting of a warning level in stages is adopted in an example of execution of a health check mode;

FIG. 11 is a view showing the state of a change in the current value of the motor during the execution of a process and during the execution of the health check mode;

FIG. 12 is a view in which differences between a change in the current value of the motor and a change in temperature of the rotating body to a change in gas load are compared with each other;

FIG. 13 is a cross-sectional view of an example of the exhaust pump;

FIG. 14 is an explanatory view of the relationship between an operation state of a client's process execution apparatus in which the exhaust pump of FIG. 13 is incorporated as discharge means and the temperature of the motor of the exhaust pump;

FIG. 15 is a view showing the result of a study test for studying the relationship between the deposition of the product in the exhaust pump and a change in the motor current of the exhaust pump when the temperature of the motor of the exhaust pump is high (C4° C.) and is low (C3° C.) in a case where the exhaust pump of FIG. 13 is operated in the situation where the artificial deposition of FIG. 2 is present; and FIG. 16 is a view showing the result of a test for studying the relationship among the flow rate of the gas flowing in the exhaust pump, the temperature of the motor of the exhaust pump, and the current value of the motor.

DESCRIPTION OF THE PREFERRED EMBODIMENTS

Figure 7:
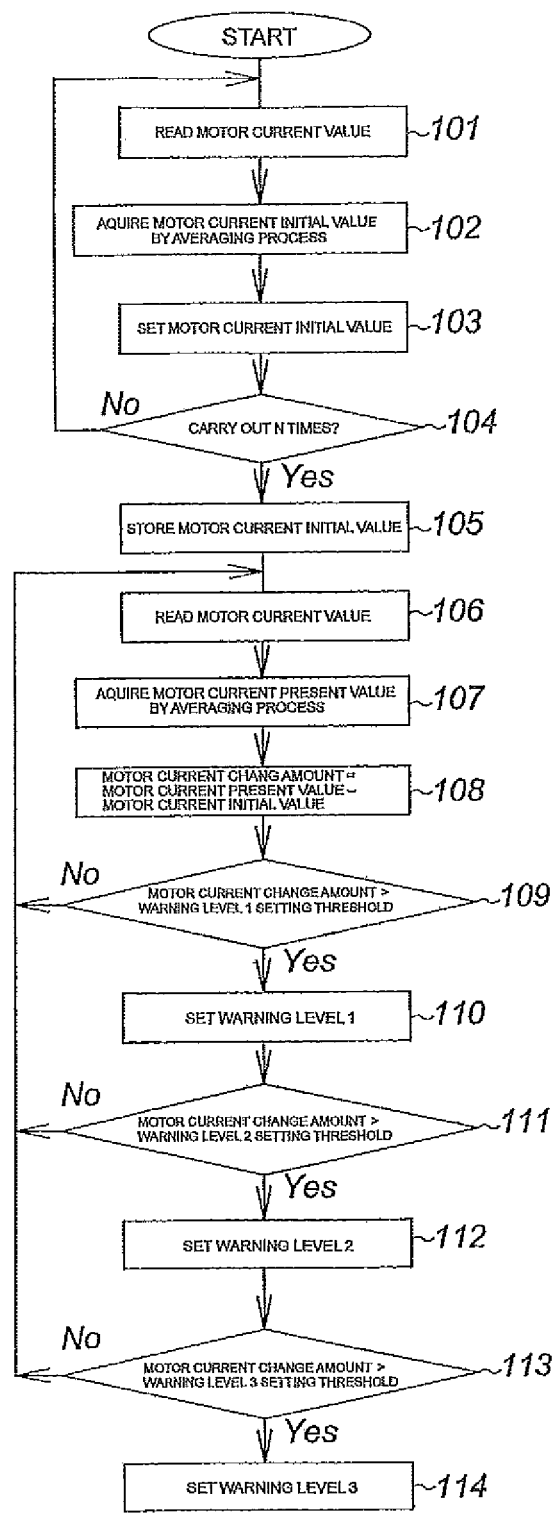
FIG. 7 is a flowchart of execution of an example where an deposition in the exhaust pump is detected based on a motor current change amount.

A preferred embodiment of the present invention is described hereinbelow in detail with reference to the accompanying drawings.

(A) Description of an Example where a Deposition in an Exhaust Pump is Detected Based on a Motor Current Change Amount (Corresponding to a First Aspect of the Present Invention)

First, a description is given of the relationship between the deposition of a product in an exhaust pump and a change in the motor current of the exhaust pump.

In the case of an exhaust pump P shown in FIG. 13, the product is deposited in a gas flow path in the lower part of a cylindrical section 1 (see S portions in FIG. 13). When the product is deposited, the pressure in the lower part of a blade section 2 at the lowest tier of the exhaust pump P is increased. As a result, a load applied to a motor M is increased, and hence a current value of the motor is controlled so as to change to increase.

Consequently, as shown in FIG. 2, the present inventors created a deposition state of an artificial product at a portion in the gas flow path of the exhaust pump P of FIG. 13 where the product was most likely to be deposited (specifically, the S portions in FIG. 13), and conducted a study test for studying the relationship between the deposition of the product in the exhaust pump P and a change in the current of the motor M of the exhaust pump P. FIG. 3 shows the result of the test.

As shown in FIG. 3, the present inventors found out that the current value of the motor clearly changed to increase at a time point when the deposition thickness of the deposition in the exhaust pump exceeded 50% of the gas flow path (see a product deposition rate of 50% in FIG. 2) in the S portion of FIG. 13. Accordingly, by detecting the change amount of the current value of the motor (hereinafter referred to as a "motor current change amount"), it is possible to detect the deposition in the exhaust pump or estimate its deposition thickness.

Note that the deposition thickness of the deposition in the exhaust pump with which the current value of the motor starts to rise is not 50% for all models, and the deposition thickness thereof varies according to the design. In addition, for example, as shown in FIGS. 3 and 4, in a case where the flow rate of gas flowed into the exhaust pump P is low such as Operation Condition 1 of the exhaust pump P (a gas B is flowed in at 800 sccm), the change rate of the current value of the motor is low so that it is not possible to significantly determine an increase in current value of the motor. Further, the current value of the motor changes according to the individual difference of the exhaust pump P, and a pump temperature when the gas is flowed into the exhaust pump P at the same flow rate. As a result, in order to significantly determine the increase in current value of the motor, a motor current increase (ΔI) of at least 10% or more is required.

FIG. 1 is a functional block diagram of an example where a deposition detection device as the embodiment of the present invention is incorporated in a pump control apparatus of the exhaust pump P of FIG. 13.

A pump control apparatus 50 in the drawing has a microcomputer section 51 for performing centralized control of the exhaust pump P, a motor driver 52 for driving the motor M of the exhaust pump P, communication means 53 for performing communication with an external apparatus such as a client apparatus including a client's process apparatus that is not shown on the basis of an instruction from the microcomputer section 51, display means 54 for displaying the operation status of the exhaust pump P on the basis of the instruction from the microcomputer section 51, and input operation means 55 for performing the input of a set value or the like for the microcomputer section 51, and the motor driver 52 has the function as motor current value detection means for detecting the current value of the motor M.

The microcomputer section 51 has the function of executing processes from (1-1) to (1-2) shown below as the initial process, and processes from (2-1) to (2-4) shown below as the subsequent process after the initial process by executing each process in a flowchart shown in FIG. 7.

<Initial Process>
(1-1) Process for reading the current value of the motor M.
(1-2) Process for determining a motor current initial value based on the current value of the motor read in (1-1) mentioned above and storing the determined motor current initial value.

<Subsequent Process>
(2-1) Process for reading the current value of the motor M.
(2-2) Process for determining a motor current present value based on the current value of the motor read in (2-1) mentioned above.
(2-3) Process for determining a motor current change amount by subtracting the motor current initial value stored in (1-2) mentioned above from the motor current present value determined in (2-2) mentioned above.
(2-4) Process for performing setting of warning based on the motor current change amount determined in (2-3) mentioned above.

<A Detail of Process Contents of the Initial Process and the Subsequent Process>

Although the reading of the current value of the motor in (1-1) mentioned above is performed by a method for reading a motor current detection value from the motor driver 52, the current value of the motor M may be read by other methods. The same applies to the reading of the current value of the motor in (2-1) mentioned above.

As the motor current initial value, there can be adopted a motor current average value. As a method for determining the motor current average value, there can be adopted various methods such as, e.g., a method for obtaining the motor current average value by reading the current value of the motor a plurality of times within a predetermined time period and dividing the total value of the read plural current values of the motor by the number of reading times, and a method for finally obtaining the motor current initial value by acquiring several motor current initial values by repeatedly performing the above-described method a plurality of times and dividing the total value of the acquired plural motor current initial values by the number of repetitions. The same applies to the method for determining the motor current present value.

As a method for storing the motor current initial value, there can be adopted, e.g., a method in which a part of a nonvolatile storage medium (not shown) included in the microcomputer section 51 is allocated as a storage area and the motor current initial value is stored in the storage area, and other methods.

For the motor current present value, similarly to the motor current initial value, there may be adopted the method for storing the motor current present value in the storage area of the nonvolatile storage medium. As another method, there can be also adopted a method in which a part of a nonvolatile storage medium such as a RAM or the like (not shown) included in the microcomputer section 51 is allocated as a storage area, and the motor current present value is stored in the storage area.

As described above, when the configuration is adopted in which the motor current initial value and the motor current present value are stored in the storage area, for the process for determining the motor current change amount, the motor current initial value and the motor current present value may be acquired from the storage area, and the acquired motor current initial value may be subtracted from the acquired motor current present value.

For the setting of warning performed based on the motor current change amount, there can be adopted, e.g., a method for setting a warning level in stages in accordance with the motor current change amount such as Level 1, Level 2, . . . , and other methods.

In the method for setting the warning level in stages, for the set warning level, there can be adopted various processes for reporting the warning content such as, e.g., outputting of the warning level from the communication means 53 to the external apparatus, and displaying of the warning level in the display means 54.

In addition, in the setting of the warning level in stages, the warning level may be raised in response to an increase in motor current change amount such as, e.g., setting the warning level to Level 1 when the motor current change amount is +30% or more from the motor current initial value, setting the warning level to Level 2 when the motor current change amount is +40% or more therefrom, and setting the warning level to Level 3 when the motor current change amount is +50% or more therefrom.

FIG. 7 is a flowchart showing the flow of each of the initial process and the subsequent processes in a case where the setting of the warning level in stages is adopted in the example where the deposition in the exhaust pump is detected based on the motor current change amount.

The process in the flowchart of FIG. 7 is executed in the microcomputer section 51 when a process start command is inputted to the microcomputer section 51 by the activation of the microcomputer section 51 or via the input operation means 55, and when the process start command is received by the communication means 53.

Referring to FIG. 7, the microcomputer section 51 firstly reads the current value (the current value of the motor) detected in the motor driver 52 into a buffer (Step 101), and acquires and sets the motor current initial value by performing averaging process on the read current value of the motor (Steps 102 and 103). By repeating the processes from Step

101 to Step 103 N times (No in Step 104), when the microcomputer section 51 determines the final motor current initial value (Yes in Step 104), the microcomputer section 51 stores the determined motor current initial value in the storage area (Step 105). With the above-described operation, the initial process is ended.

Next, as the subsequent process, the microcomputer section 51 reads the current value of the motor into the buffer (Step 106), determines the motor current present value by performing the averaging process on the read current value of the motor (Step 107), determines the motor current change amount by subtracting the motor current initial value from the motor current present value (Step 108), and the flow advances to Step 109.

In Step 109, it is judged whether or not the motor current change amount determined in Step 108 is not less than a warning setting threshold of Level 1 (e.g., +30% from the motor current initial value). At this point, when the motor current change amount is not less than the warning setting threshold of Level 1 (Yes in Step 109), the warning setting of Level 1 is performed (Step 110), and the flow advances to the next Step 111.

In Step 111, it is judged whether or not the motor current change amount determined in Step 108 is not less than a warning setting threshold of Level 2 (e.g., +40% from the motor current initial value). At this point, when the motor current change amount is not less than the warning setting threshold of Level 2 (Yes in Step 111), the previously set warning setting of Level 1 is cancelled, the warning setting of Level 2 is performed (Step 112), and the flow advances to the next Step 113.

In Step 113, it is judged whether or not the motor current change amount determined in Step 108 is not less than a warning setting threshold of Level 3 (e.g., +50% from the motor current initial value). At this point, when the motor current change amount is not less than the warning setting threshold of Level 3 (Yes in Step 113), the previously set warning setting of Level 2 is cancelled, and the warning setting of Level 3 is performed (Step 114). Examples of the warning settings of Levels 1, 2, and 3 are as described above.

Note that, when the motor current change amount is less than the warning setting threshold of Level 1 in Step 109, when the motor current change amount is less than the warning setting threshold of Level 2 in Step 111, and when the motor current change amount is less than the warning setting threshold of Level 3 in Step 113, the flow returns to the process of Step 106 (No in Step 109, No in Step 111, and No in Step 113), and the processes from Step 106 to Step 114 is repeated.

The above-described warning setting threshold of each Level (+30%, +40%, or +50% from the motor current initial value) is only an example, and the warning setting threshold may be arbitrarily set irrespective of the example.

In the initial process described above, it is preferable to perform the exhausting of the gas for a time period required for the stabilization of the current value of the motor M, e.g., for several minutes, and then determine the motor current average value based on the read current value of the motor.

The upper limit of the flow rate of the gas flowed into the exhaust pump P during the initial process may be set within a range in which the motor current initial value satisfies the following Expression 1. By setting the flow rate thereof in this manner, the current of the motor M does not exceed the maximum supply current of the motor driver 52 so that it is possible to more accurately measure the motor current change amount. When an unnecessarily large amount of the gas is flowed into the exhaust pump without considering the maximum supply current value of the motor driver 52, the current of the motor M cannot increase and the rotating body R cannot maintain its rotation speed so that it is not possible to accurately measure the motor current change amount.

$$IO + I\text{max} < I \qquad \text{<Expression 1>}$$

wherein I represents the maximum supply current value of the motor driver, IO represents the motor current initial value, and Imax represents the motor current change amount of the maximum warning level (in the above example, since the warning of Level 3 is the maximum warning level, Imax corresponds to +50% from the motor current initial value).

The lower limit of the flow rate of the gas flowed into the exhaust pump P during the initial process is set to not less than the gas flow rate which allows significant determination of the change in motor current such as, e.g., the flow rate causing the change in the current value of the motor to be +10% or more from the motor current initial value when the deposition amount of the product is increased. In the case of FIG. 3, when the gas B and the flow rate of 1200 sccm are selected as the type and the flow rate of the gas, the above-described two conditions (the upper and lower limits of the gas flow rate) are satisfied, and it becomes possible to more accurately estimate the deposition thickness.

<Timing of Execution of the Initial Process>

After being shipped from a factory, the exhaust pump P is incorporated in an apparatus for executing a process (a process execution apparatus), and is used as discharge means thereof. Because of such use mode of the exhaust pump P, the initial process can be performed before the shipment of the exhaust pump from the factory, when the process is executed immediately after an end user who actually uses the exhaust pump incorporates the exhaust pump P in the process execution apparatus, or when the process is periodically suspended.

In the case where the initial process is performed before the shipment of the exhaust pump P from the factory, the type and the flow rate of the gas flowed into the exhaust pump P are tentatively specified, and the current value of the motor M when the exhaust pump P is operated according to the specification is read. Subsequently, the motor current average value is determined based on the read current value of the motor and the determined motor current average value is stored (the above-described processes from (1-1) to (1-2)).

<An Example where the Initial Process and the Subsequent Process are Performed in a Health Check Mode>

In the case where the process is periodically suspended and the initial process is performed, it is possible to perform the initial process and the subsequent process as a health check mode of the exhaust pump P.

In the health check mode, the type and the flow rate of gas for the health check flowed into the exhaust pump P are specified, the current value of the motor M when the exhaust pump P is operated according to the specification is read, the motor current initial value is determined based on the read current value of the motor, and the determined motor current initial value is stored (the above-described processes from (1-1) to (1-2)). Thereafter, by sequentially executing the above-described processes from (2-1) to (2-4), the motor current change amount may be determined and the setting of warning may be performed based on the determined motor current change amount.

The execution of the health check mode may be frequently performed at the frequency of once a day for the process in which the deposition increase speed of the product is fast, and may also be performed at the frequency of once in one or two weeks in other processes.

When the above-described health check mode is adopted, the microcomputer section 51 needs to recognize the execution of the health check mode before executing the initial process and the subsequent process. This is for more reliably estimating the deposition state of the product by distinguishing the process from the health check mode.

FIG. 11 shows the current value of the motor during the execution of the process and the current value of the motor during the execution of the health check mode. As can be seen from the drawing, there are cases where the current value of the motor during the execution of the process is higher than that during the execution of the health check mode. As a result, if the microcomputer section 51 does not recognize the execution of the health check mode, the initial process and the subsequent process are disadvantageously performed despite the execution of the process so that a problem can arise that erroneous setting of warning is performed by reading the high current value of the motor during the execution of the process.

<Recognition of the Health Check Mode by Utilizing a Health Check Command>

As a method for recognizing the execution of the health check mode, there is a method which utilizes a health check command. Specifically, the microcomputer section 51 acquires the health check command (signal) indicative of the flowing of the gas for the health check from a client via the communication means 53 or the input operation means 55, recognizes the execution of the health check mode by using the health check command as a trigger, and executes the initial process and the subsequent process. With this arrangement, the initial process and the subsequent process are performed only when the health check mode is executed, and hence the erroneous setting of warning is not performed.

<An Example where the Health Check Mode is Recognized without Utilizing the Health Check Command>

During the execution of the process, the flow rate and the type of the gas flowing in the exhaust pump P change so that the current value of the motor M fluctuates by a large amount. On the other hand, in the health check mode, since the type and the flow rate of the gas flowed into the exhaust pump P are specified, the current value of the motor M is relatively stabilized. By utilizing such fluctuation and stabilized state of the current value of the motor, it is also possible to recognize the execution of the health check mode without utilizing the health check command.

Specifically, health check gas introduction time Th (time when the gas for the health check is flowed into the exhaust pump P) is set to sufficiently longer (e.g., ten times) time than maximum time Tpmax when the current value of the motor fluctuates in the process. The microcomputer section 51 constantly monitors the current value of the motor and, when the current value of the motor is continuously stabilized for a Tc time period (=the health check gas introduction time Th−time until the current value of the motor is stabilized) shown in FIG. 11, the microcomputer section 51 may recognize that the health check mode is executed.

FIG. 10 is a flowchart showing the flow of the subsequent process in a case where the above-described setting of the warning level in stages is adopted in an example of execution of the health check mode.

Note that, in the example of execution of the health check mode of FIG. 10, it is assumed that the above-described initial process has been already performed, and a motor current initial value Ii is thereby stored in the storage area of the microcomputer section 51. In addition, it is assumed that the read current value of the motor is stored in a buffer memory.

Referring to FIG. 10, first, a value T of a health check timer is reset (Step 401), and a current total value. It is reset (Step 402). Next, as the subsequent process after the initial process, a current value of the motor Ic is read (Step 403), and the read current value of the motor Ic is compared with the motor current initial value Ii pre-stored in the initial process (Step 404).

Subsequently, when the read current value of the motor Ic is not less than the motor current initial value Ii (Yes in Step 404), the previously read current value of the motor (hereinafter referred to as a "previous current value of the motor Ib") is read from the buffer memory (Step 405), and the current value of the motor (hereinafter referred to as a "present current value of the motor Ic") read in Step 403 is stored in the buffer memory (Step 406).

Next, a health check mode judgment threshold serving as a judgment criterion of whether or not the health check mode is executed (specifically, the threshold is a fluctuation amount of the current value of the motor and is, e.g., a value close to zero) is compared with an absolute value obtained by subtracting the present current value of the motor Ic from the previous current value of the motor Ib (a fluctuation amount between the previous and present current value of the motors). Then, when the absolute value is smaller than the health check mode judgment threshold (Yes in Step 407), the value T of the health check timer is incremented (Step 408), and the flow advances to the next Step 409.

In Step 409, as a totalizing process of the current value of the motor, the present current value of the motor Ic is added to the current total value It and, in the next Step 410, the current total value It is updated by storing the value obtained by the addition as the current total value It. Further, in the next Step 411, the value T of the health check timer is compared with the Tc time period (=the health check gas introduction time Th−the time until the current value of the motor is stabilized) shown in FIG. 11.

Then, in Step 411 mentioned above, when T>=Tc is satisfied (Yes in Step 411), the microcomputer section 51 recognizes the execution of the health check mode, determines a motor current present value Ia by dividing the current total value It after the update by the value T of the health check timer (It/T), and determines the motor current change amount by subtracting the motor current initial value from the motor current present value (Step 412). Subsequent processes from Step 413 to Step 418 is the same as the above-described processes from Step 109 to Step 114 so that the detailed description thereof is omitted.

In the example described thus far (the example where the deposition in the exhaust pump is detected based on the motor current change amount), the configuration is adopted in which the motor current initial value is determined in the initial process, the motor current present value is determined in the subsequent process, the amount of change to the motor current present value from the motor current initial value is further determined, the deposition in the exhaust pump is detected based on the change amount, and the setting of warning is performed. As a result, for example, the above-described initial process is performed during the execution of the process immediately after the end user incorporates the exhaust pump P in the process execution apparatus, whereby the change amount of the motor current based on the actual process is obtained and the detection of the deposition in the exhaust pump is performed based on the change amount so that, in any process irrespective of the type or the flow rate of the gas used in the process, it is possible to more accurately detect the deposition in the pump (the deposition in the exhaust pump) used in the process, and issue the warning.

Since the pump control apparatus 50 of the exhaust pump P in operation at the end user includes the motor driver 52 having the function of detecting the current value of the motor M of the exhaust pump P, it is possible to handle the above-described example where the deposition in the exhaust pump is detected based on the change amount of the current value of the motor only by changing software without adding any hardware resource to the exhaust pump in operation at the end user.

In a process having a large fluctuation in gas load to the exhaust pump P (e.g., an etching apparatus), a fluctuation in current value of the motor is also large, and hence it is difficult to steadily read the current value of the motor. However, with the introduction of the above-described health check mode, the current value of the motor can be steadily read so that, even in the process having the large fluctuation in gas load, it becomes possible to detect the deposition state of the product with excellent precision.

In addition, in the health check mode, it is possible to determine and store the motor current initial value at the time of the shipment of the product including the exhaust pump P and its pump control apparatus 50, and hence it is also possible to omit the setting operation of the motor current initial value by the initial process at the end user.

(B) Description of an Example where the Deposition in the Exhaust Pump is Detected Based on a Rotating Body Temperature Change Amount (Corresponding to a Second Aspect of the Present Invention)

First, a description is given of the relationship between the deposition of the product in the exhaust pump and a change in the temperature of the rotating body of the exhaust pump.

FIG. 5 is an explanatory view of the result (the relationship between the product deposition rate and the temperature of the rotating body) when the exhaust pump P of FIG. 13 is operated in the situation where the artificial product of FIG. 2 is present and the temperature of the rotating body R of the exhaust pump P is measured.

As shown in FIG. 5, the present inventors found out that the temperature of the rotating body R clearly changed to increase at a time point when the deposition thickness of the deposition in the exhaust pump exceeded 50% of the gas flow path (see the product deposition rate of 50% in FIG. 2). Consequently, it is possible to detect the deposition in the exhaust pump or estimate the deposition thickness thereof by detecting the change amount of the temperature of the rotating body.

In addition, the present inventors found out that the change rate of the temperature of the rotating body R was low when the flow rate of the gas flowed into the exhaust pump P was low so that it was not possible to significantly determine an increase in the temperature of the rotating body R. In view of the temperature differences at the time of start of the operation and at the time of stabilization of the temperature resulting from the individual difference of the exhaust pump P, in order to significantly determine the temperature increase amount of the rotating body R, a temperature increase of 5° C. or more is required.

As shown in FIG. 12, as compared with the current value of the motor M, the temperature of the rotating body R does not change in response to the change of the gas load acting on the rotating body R for a short period of time (about several minutes). As shown in FIG. 12, in many cases, substantially the same pattern of combination of the gas type and the flow rate thereof is continuously used in the actual process. In the case of such process, the temperature of the rotating body R is equal to integration of a change in current value of the motor with time.

From the foregoing, in the present example, immediately after the exhaust pump P is incorporated in the process execution apparatus and after the process is executed the specified number of times, as initial process, the temperature of the rotating body R of the exhaust pump P is read, a rotating body temperature initial value is determined based on the read temperature of the rotating, and the determined rotating body temperature initial value is stored. Further, in the subsequent process after the initial process, the temperature of the rotating body R is read each time the process is executed, and a rotating body temperature present value is determined based on the read temperature of the rotating body. Subsequently, the amount of change to the rotating body temperature present value from the rotating body temperature initial value (hereinafter referred to as a "rotating body temperature change amount") is determined, the deposition is detected based on the determined rotating body temperature change amount, and setting of warning is performed. In order to perform such a process, the pump control apparatus 50 of FIG. 1 and the exhaust pump P of FIG. 13 described above are configured in the following manner.

Temperature detection means 7 for detecting the temperature of the rotating body R is provided in the exhaust pump P of FIG. 13, and the temperature of the rotating body R detected in the temperature detection means 7 is inputted to the pump control apparatus 50 (see FIG. 1) of the exhaust pump P.

Subsequently, the microcomputer section 51 of the pump control apparatus 50 has the function of executing processes from (3-1) to (3-2) shown below as the initial process and processes from (4-1) to (4-4) shown below as the subsequent process after the initial process by executing each process in the flowchart shown in FIG. 8.

<Initial Process>

(3-1) Process for reading the temperature of the rotating body of the exhaust pump P.

(3-2) Process for determining the rotating body temperature initial value based on the temperature of the rotating body read in (3-1) mentioned above and storing the determined rotating body temperature initial value.

<Subsequent Process>

(4-1) Process for reading the temperature of the rotating body of the exhaust pump P.

(4-2) Process for determining the rotating body temperature present value based on the temperature of the rotating body read in (4-1) mentioned above.

(4-3) Process for determining the rotating body temperature change amount by subtracting the rotating body temperature initial value stored in (3-2) mentioned above from the rotating body temperature present value determined in (4-2) mentioned above.

(4-4) Process for performing the setting of warning based on the rotating body temperature change amount determined in (4-3) mentioned above.

<A Detail of Process Contents of the Initial Process and the Subsequent Process>

The reading of the temperature of the rotating body in (3-1) mentioned above is performed by reading the input from the temperature detection means 7. The same applies to the reading of the temperature of the rotating body in (4-1) mention above.

As the rotating body temperature initial value, there can be adopted a rotating body temperature average value. A method for determining the rotating body temperature average value is similar to the corresponding method for determining the motor current average value described above so that the detailed description thereof is omitted.

In addition, a method for storing the rotating body temperature initial value, a method for determining the rotating body temperature change amount, and a method for performing the setting of warning based on the rotating body temperature change amount are similar to the corresponding methods described above, i.e., the method for storing the motor current initial value, the method for determining the motor current change amount, and the method for performing the setting of warning based the motor current change amount so that the detailed description thereof is omitted.

Figure 8:
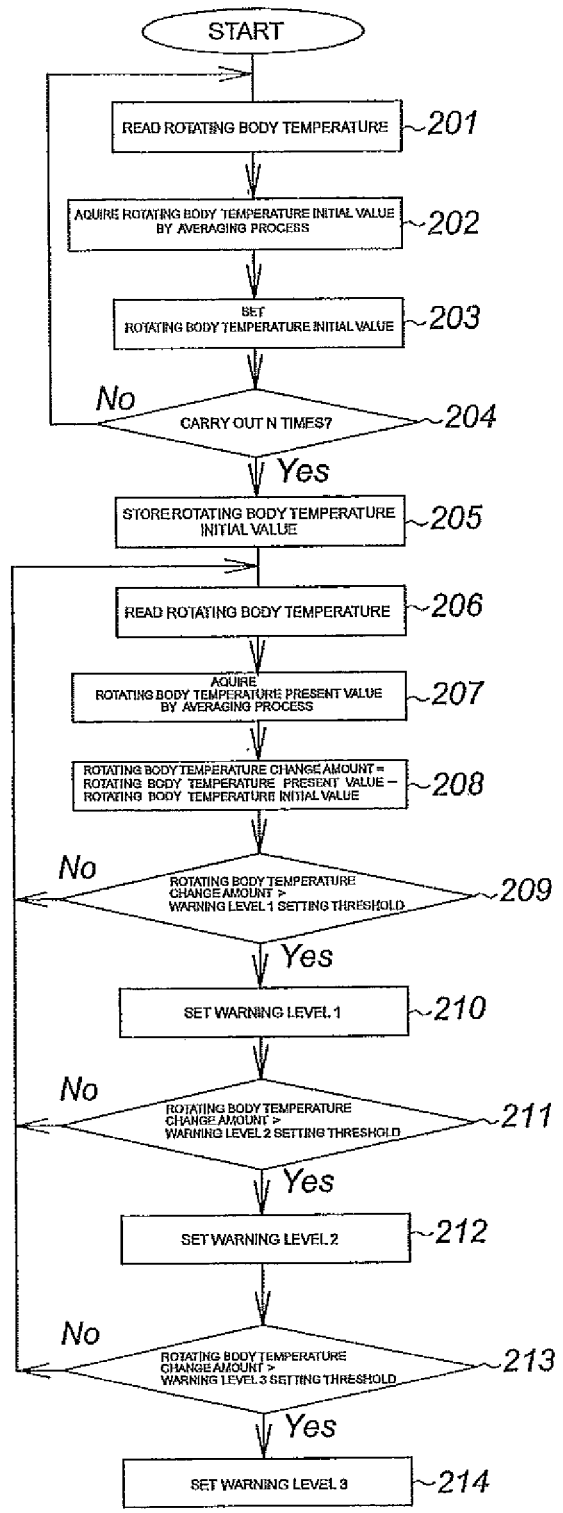
FIG. 8 is a flowchart of execution of an example where the deposition in the exhaust pump is detected based on a rotating body temperature change amount.

FIG. 8 is a flowchart showing the flow of each of the initial process and the subsequent process in a case where the setting of the warning level in stages is adopted in the example where the deposition in the exhaust pump is detected based on the rotating body temperature change amount.

Note that the execution timing of the processes in the flowchart is similar to the execution timing of the processes in the flowchart of FIG. 7.

Referring to FIG. 8, the microcomputer section 51 firstly reads the temperature of the rotating body R into the buffer through the temperature detection means 7 (Step 201), and acquires and sets the rotating body temperature initial value by performing averaging processes on the read temperature of rotating body (Steps 204 and 203). By repeating the processes from Step 201 to Step 203 N times (No in Step 204), when the microcomputer section 51 determines the final rotating body temperature initial value (Yes in Step 204), the microcomputer section 51 stores the determined rotating body temperature initial value in the storage area (Step 205). With the above-described operation, the initial process is ended.

The microcomputer section 51 may be instructed to perform the reading of the initial value of the temperature of the rotating body via the input operation means 55 and the communication means 53. In addition, as a method for automatically performing the process, it is also possible to set, as the initial temperature, the maximum temperature of the rotating body during a given time period (e.g., 1000 hours) after the exhaust pump P is mounted on the apparatus. It is of course possible to set a different given time period according to the process or the like.

Next, the microcomputer section 51 reads the temperature of the rotating body R into the buffer (Step 206), determines the rotating body temperature present value by performing the above-described averaging process on the read temperature of the rotating body (Step 207), determines the rotating body temperature change amount by subtracting the rotating body temperature initial value from the rotating body temperature present value (Step 208), and the flow advances to Step 209.

In Step 209, it is judged whether or not the rotating body temperature change amount determined in Step 208 is not less than a warning setting threshold of Level 1 (e.g., +5° C. from the rotating body temperature initial value). At this point, when the rotating body temperature change amount is not less than the warning setting threshold of Level 1 (Yes in Step 209), the warning setting of Level 1 is performed (Step 210), and the flow advances to the next Step 211.

In Step 211, it is judged whether or not the rotating body temperature change amount determined in Step 208 is not less than a warning setting threshold of Level 2 (e.g., +10° C. from the rotating body temperature initial value). At this point, when the rotating body temperature change amount is not less than the warning setting threshold of Level 2 (Yes in Step 211), the previously set warning setting of Level 1 is cancelled, the warning setting of Level 2 is performed (Step 212), and the flow advances to the next Step 213.

In Step 213, it is judged whether or not the rotating body temperature change amount determined in Step 208 is not less than a warning setting threshold of Level 3 (e.g., +15° C. from the rotating body temperature initial value). At this point, when the rotating body temperature change amount is not less than the warning setting threshold of Level 3 (Yes in Step 213), the previously set warning setting of Level 2 is cancelled, and the warning setting of Level 3 is performed (Step 214). Examples of the warning settings of Levels 1, 2, and 3 are as described above.

Note that, when the rotating body temperature change amount is less than the warning setting threshold of Level 1 in Step 209, when the rotating body temperature change amount is less than the warning setting threshold of Level 2 in Step 211, and when the rotating body temperature change amount is less than the warning setting threshold of Level 3 in Step 213, the flow returns to the process of Step 206 (No in Step 209, No in Step 211, and No in Step 213), and the processes from Step 206 to Step 214 is repeated.

Each of the above-described warning setting thresholds (+5° C., +10° C., and +15° C. from the rotating body temperature initial value) is only an example, and the warning setting threshold may be arbitrarily set irrespective of the example.

In the example described thus far (the example where the deposition in the exhaust pump is detected based on the rotating body temperature change amount), the configuration is adopted in which the rotating body temperature initial value is determined in the initial process, the rotating body temperature present value is determined in the subsequent process, the amount of change to the rotating body temperature present value from the rotating body temperature initial value is further determined, and the deposition in the exhaust pump is detected based on the change amount. As a result, for example, the above-described initial process is performed during the execution of the process immediately after the end user incorporates the exhaust pump in the process execution apparatus, whereby the change amount of the temperature of the rotating body based on the actual process is obtained and the detection of the deposition in the exhaust pump is performed based on the change amount so that, in any process irrespective of the type or the flow rate of the gas used in the process, it is possible to more accurately detect the deposition in the pump (the deposition in the exhaust pump) used in the process, and issue the warning.

Figure 9:
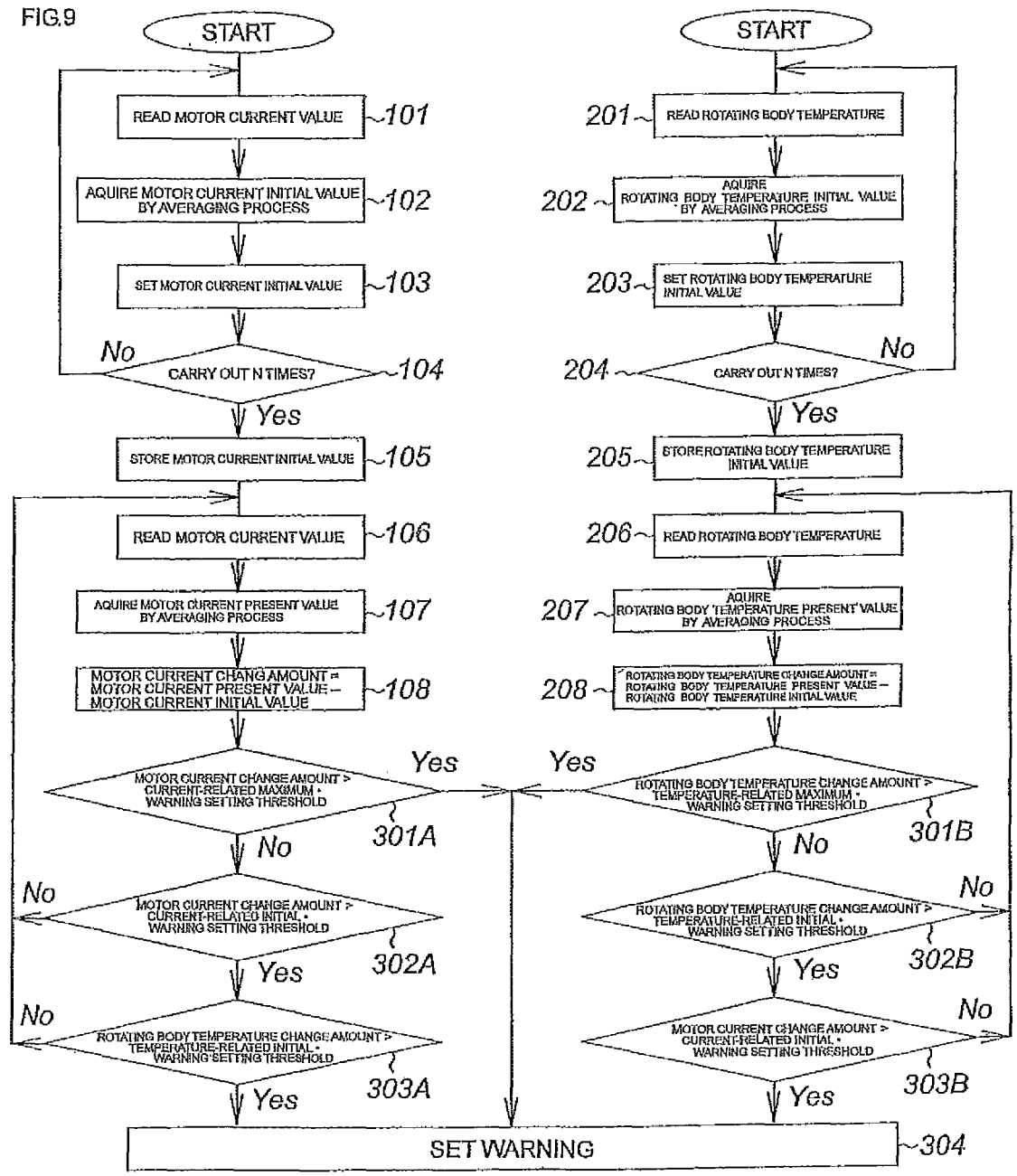
FIG. 9 is a flowchart of execution of an example where the deposition in the exhaust pump is detected based on the motor current change amount and the rotating body temperature change amount.

FIG. 9 is a flowchart showing the flow of each of the initial process and the subsequent process in a case where the above-described setting of the warning level in stages is adopted in an example where the deposition in the exhaust pump is detected based on the motor current change amount and the rotating body temperature change amount (corresponding to a third aspect of the present invention).

In the flowchart of FIG. 9, the same process as that of FIG. 7 or FIG. 8 is designated with the same reference numeral. In addition, the execution timing of the process in the flowchart of FIG. 9 is similar to the execution timing of the process in the flowchart of FIG. 7.

In FIG. 9, the processes from Step 101 to Step 108 and the processes from Step 201 to Step 208 concurrently proceed. Note that the group of the concurrently proceeding process corresponds to the processes from Step 101 to Step 108 shown in the flowchart of FIG. 7 and the processes from Step 201 to Step 208 shown in the flowchart of FIG. 8, and hence the detailed description thereof is omitted. Hereinbelow, a description is given of each process of Step 301A to Step 303A, Step 301B to Step 303B, and Step 304 that are subsequent to and different from the process mentioned above.

In Step 301A, the motor current change amount determined in Step 108 is compared with a warning setting threshold that specifies a maximum warning level of the motor current change amount (e.g., +50% from the motor current change amount, hereinafter referred to as a "current-related maximum warning setting threshold"), and it is judged whether or not the motor current change amount is not less than the current-related maximum warning setting threshold.

In Step 301A, when the motor current change amount is not less than the current-related maximum warning setting threshold, the process of setting of warning corresponding to the current-related maximum warning setting threshold is performed (Yes in Step 301A, Step 304). On the other hand, when the motor current change amount is less than the current-related maximum warning setting threshold (No in Step 301A), the flow advances to the next Step 302A.

In Step 302A, the motor current change amount determined in Step 108 is compared with a warning setting threshold that specifies an initial warning level of the motor current change amount (e.g., +30% from the motor current change amount, hereinafter referred to as a "current-related initial warning setting threshold"), and it is judged whether or not the motor current change amount is not less than the current-related initial warning setting threshold.

In Step 303A, the rotating body temperature change amount determined in Step 208 is compared with a warning setting threshold that specifies an initial warning level of the rotating body temperature change amount (e.g., +5° C. from the rotating body temperature change amount, hereinafter referred to as a "temperature-related initial setting of warning threshold"), and it is judged whether or not the rotating body temperature change amount is not less than the temperature-related initial warning setting threshold.

Subsequently, when the motor current change amount is not less than the current-related initial warning setting threshold (Yes in Step 302A), and the rotating body temperature change amount is not less than the temperature-related initial warning setting threshold (Yes in Step 303A), the process of the setting of warning corresponding to the current-related or temperature-related initial warning setting threshold is performed (Step 304). On the other hand, when the motor current change amount is less than the current-related initial warning setting threshold (No in Step 302A), or when the rotating body temperature change amount is less than the temperature-related initial warning setting threshold (No in Step 303A), the flow returns to Step 106.

In Step 301B, the rotating body temperature change amount determined in Step 208 is compared with a warning setting threshold that specifies a maximum warning level of the rotating body temperature change amount (e.g., +15° C. from the rotating body temperature change amount, hereinafter referred to as a "temperature-related maximum warning setting threshold"), and it is judged whether or not the rotating body temperature change amount is not less than the temperature-related maximum warning setting threshold.

Subsequently, in Step 301B, when the rotating body temperature change amount is not less than the temperature-related maximum warning setting threshold (Yes in Step 301B), the process of the setting of warning corresponding to the temperature-related maximum warning setting threshold is performed (Step 304). On the other hand, when the rotating body temperature change amount is less than the temperature-related maximum warning setting threshold (No in Step 301B), the flow advances to the next Step 302B.

In Step 302B, the rotating body temperature change amount determined in Step 208 is compared with the temperature-related initial warning setting threshold. In addition, in the next Step 303B, the motor current change amount determined in Step 108 is compared with the current-related initial warning setting threshold.

Then, when the rotating body temperature change amount is not less than the temperature-related initial warning setting threshold (Yes in Step 302B), and the motor current change amount is not less than the current-related initial warning setting threshold (Yes in Step 303B), a process of the setting of warning corresponding to the temperature-related or current-related initial warning setting threshold is performed (Step 304). On the other hand, when the rotating body temperature change amount is less than the temperature-related initial warning setting threshold (No in Step 302B), or when the motor current change amount is less than the current-related initial warning setting threshold (No in Step 303B), the flow returns to Step 206.

In the example described thus far (the example where the deposition in the exhaust pump is detected based on the motor current change amount and the rotating body temperature change amount), since the deposition in the exhaust pump is detected based on the motor current change amount and the rotating body temperature change amount, it is possible to more precisely detect the deposition in the exhaust pump than in the case where the deposition in the exhaust pump is detected based only on the motor current change amount or the rotating body temperature change amount.

In each example described thus far, although the warning level is classified into several levels, there can be adopted a configuration in which the warning level is not classified. When the warning level is classified into several levels, the maintenance operation of the exhaust pump is facilitated at the end user. For example, a backup exhaust pump is prepared at a time point when the warning of Level 1 is issued and the exhaust pump is replaced at a time point when the warning of Level 2 is issued, whereby it is possible to minimize the number of possessed backup exhaust pumps and achieve a reduction in cost.

FIG. 14 is an explanatory view of the relationship between the operation state of the client's process execution apparatus in which the exhaust pump P of FIG. 13 is incorporated as the discharge means and the temperature of the motor M of the exhaust pump P.

In FIG. 14, from time t0 to time t1, the process is executed a plurality of times in the client's process execution apparatus, and the temperature of the motor M of the exhaust pump P is thereby stabilized at a steady-state temperature (C2° C.). Next, when the client's process execution apparatus is suspended from immediately after the time t1 for an overhaul or the like, due to a decrease in the load of the exhaust pump P resulting from the suspension, the temperature of the motor M of the exhaust pump P is reduced to a specific temperature (C1° C.). Thereafter, when the suspended process execution apparatus is restarted at time t2 and the process is reset and resumed in the apparatus, due to an increase in the load of the exhaust pump P from the time t2 resulting from the resumption, the temperature of the motor M of the exhaust pump P is increased. Then, at time t3 when the process has been executed in the process execution apparatus a plurality of times, the temperature of the motor M is stabilized at the steady-state temperature (C2°). Thus, the temperature of the motor M of the exhaust pump P incorporated in the client's process execution apparatus does not take the same value constantly. In accordance with the operation state of the client's process execution apparatus, a temperature difference of $\Delta C°$ C. ($\Delta C°$ C.=C2° C.-C1° C.) occurs in the motor M of the exhaust pump P.

The temperature difference of $\Delta C°$ C. of the motor M influences the current value of the motor. In order to study the influence, the present inventors conducted a study test. In the study test, the deposition state of the artificial product shown in FIG. 2 was created at a portion (specifically the S portion of FIG. 13) where the product was most likely to be deposited in the gas flow path of the exhaust pump P of FIG. 13, and the exhaust pump P was operated in the situation where such artificial product was present. Subsequently, when the temperature of the motor M of the exhaust pump P was high (C4° C.) and low (C3° C.), the relationship between the deposition of the product in the exhaust pump P and a change in the current of the motor M of the exhaust pump P was studied. The result of the study is shown in FIG. 15. Note that, in the study test, the type and the flow rate of the gas flowing in the exhaust pump P were the same when the temperature of the motor M was high (C4° C.) and when the temperature thereof was low (C3° C.). A graph A in the drawing shows the relationship between the product deposition rate and the change in the current of the motor M when the temperature of the motor M is high (C4° C.), while a graph B in the drawing shows the relationship between the product deposition rate and the change in the current of the motor M when the temperature of the motor M is low (C3° C.).

As can be seen from the graphs A and B of FIG. 15, even in the case where the type and the flow rate of the gas flowing in the exhaust pump P are the same, it can be seen that the current value of the motor when the temperature of the motor M is high (C4° C.) is different from that when the temperature thereof is low (C3° C.). The test by the present inventors reveals that, although the difference slightly differs depending on the type and the flow rate of the gas flowing in the exhaust pump P and the specifications of the motor M, the difference is about 10% at the maximum.

FIG. 16 is a view showing the result of a test for studying the relationship among the flow rate of the gas flowing in the exhaust pump P, the temperature of the motor M of the exhaust pump P, and the current value of the motor M. As shown in FIG. 16A, when the flow rate of the gas flowing in the exhaust pump P was constant, as shown in FIGS. 16B and 16C, the temperature and the current value of the motor M of the exhaust pump P started to increase at time t0 when the flowing of the gas was started. As shown in FIG. 16B, the temperature of the motor M was stabilized at a specific temperature after the lapse of specific time since the time t0 when the flowing of the gas was started. As shown in FIG. 16C, the current value of the motor M rose in the same manner as the stabilization of the temperature of the motor M, and was stabilized at a specific current value. The difference in the current value of the motor resulting from the difference in the temperature of the motor M shown in FIG. 16B was about 10% at the maximum.

As described above, since the current value of the motor when the temperature of the motor M is high (e.g., C4° C. of FIG. 15) is different from that when the temperature thereof is low (e.g., C3° C. of FIG. 15), in a case where the motor current initial value stored in the initial process is A1 of FIG. 15 and the motor current present value determined in the subsequent process is A2 of FIG. 15, the product deposition rate when the temperature of the motor M is high (C4° C.) differs from that when the temperature thereof is low (C3° C.) even in a case where the same motor current change amount $\Delta i$ (=A2-A1) is given, as shown in FIG. 15 (according to FIG. 15, the product deposition rate when the temperature of the motor M is low (C3° C.) is about 72%, while the product deposition rate when the temperature of the motor M is high (C4° C.) is about 69%).

Consequently, in order to accurately detect the deposition amount of the deposition in the exhaust pump (the product deposited in the exhaust pump P) when the temperature of the motor M is high (e.g., C4° C. of FIG. 15) in the above-described subsequent process when the temperature of the motor M is low (e.g., C3° C. of FIG. 15), it is necessary to consider the temperature of the motor M. In addition, as described in FIG. 4, since the change rate of the current value of the motor differs depending on the flow rate of the gas flowing in the exhaust pump P, it is also necessary to consider the flow rate of the gas flowing in the exhaust pump P.

In order to accurately detect the deposition amount of the product in consideration of the foregoing (the temperature of the motor M and the flow rate of the gas flowing in the exhaust pump P), in the subsequent process in the health check mode, after the gas of the specified type and flow rate is flowed into the exhaust pump P, the temperature of the motor M is measured at the stage where the current value of the motor M is read, and a motor current attained value is predicted based on the measured temperature of the motor. Subsequently, the predicted motor current attained value is adopted as the motor current present value of (2-2) described above. As a method for predicting the motor current attained value, for example, correlation data on the temperature of the motor and the motor current as shown in FIGS. 16B and 16C is pre-acquired by conducting a test in which, as shown in FIG. 16A, the gas of the specified type and flow rate is flowed into the exhaust pump P and then the temperature of the motor and the motor current are measured, and the motor current attained value may be predicted from the correlation data. Note that, in the health check mode, it is necessary to flow a certain amount of the gas. This is because, when the amount of the flowed gas is small, the change amount of the current value of the motor is small and it becomes difficult to detect the product. Consequently, in order to facilitate the detection of the product in the health check mode, it is necessary to predetermine an appropriate gas type and flow rate.

If the "motor current attained value" is explained by using the example of FIGS. 14 and 15, the "motor current attained value" is a predicted current value of the motor that is assumed to be achieved when the temperature of the motor M, which has been reduced to C1° C. or C3° C. at the time t2, rises to C2° C. or C4° C. due to the reset and resumption of the process.

The above-described "motor current attained value" can be predicted through calculation. According to graphs A and B of FIG. 15, if the type and the flow rate of the gas flowing in the exhaust pump P are the same, the difference in the current value of the motor resulting from the temperature difference of the motor M (C4-C3) is 10% at the maximum, as described above. Accordingly, in order to predict the current value of the motor (the motor current attained value) in a case where the temperature of the motor M rises to C4° C. when the temperature thereof is C3° C., a value corresponding to 10% of the current value of the motor when the temperature thereof is C3° C. may be appropriately added to the current value of the motor when the temperature thereof is C3° C. Note that the addition amount of 10% is appropriately changed according to the type or the flow rate of the gas flowing in the exhaust pump P.

As described above, the motor current attained value predicted when the temperature of the motor M is C3° C. (the current value of the motor when the temperature of the motor M rises to C4° C.) is adopted as the motor current present value when the temperature of the motor M becomes C4° C. in the above-described subsequent process, whereby even when the subsequent process is performed when the temperature of the motor M is C3° C., it is possible to detect the deposition amount of the deposition in the exhaust pump when the temperature of the motor M becomes C4° C. with excellent precision.

For the measurement of the temperature of the motor M, there can be used a method that utilizes a temperature sensor (not shown) as a part of the motor M or an attachable temperature sensor.

The prediction of the motor current attained value may be carried out in the initial process. In this case, in the initial process, after the gas of the specified type and flow rate is flowed into the exhaust pump P, the temperature of the motor M is measured at the stage where the current value of the motor M is read, and the motor current attained value is predicted based on the measured temperature of the motor. Subsequently, the predicted motor current attained value is adopted and stored as the motor current initial value of (1-2) described above.

In the above description, although a so-called composite blade type exhaust pump having the blade section 2 and the thread groove section 5 shown in FIG. 13 has been used as the example and the description has been given of the configuration in the case where the product deposited in the gas flow path of the exhaust pump is detected, the present invention can be applied to the case where the product deposited in the gas flow path is detected in another exhaust pump, e.g., in a so-called full blade type exhaust pump without the thread groove section 5 of FIG. 13.

What is claimed is:

1. A deposition detection device for an exhaust pump for exhausting gas by a rotational movement of a rotating body driven by a motor, the deposition detection device comprising a motor driver, the deposition detection device configured to:

as an initial process before an operation process of the exhaust pump:
  measure, in response to causing a specified process gas type which is different than a gas type of the operation process to flow into the exhaust pump or causing a process gas in a specified flow rate which is different than a flow rate of the operation process to flow into the exhaust pump, a motor current value of the motor, wherein at least one of the specified process gas type or the specified flow rate is configured to stabilize the motor current value;
  read, using the motor driver of the deposition detection device, the motor current value of the motor a plurality of times when the specified process gas type or the process gas in the specified flow rate is flowed into the exhaust pump;
  calculate a motor current initial average value of the motor based on the read motor current value of the motor;
  determine a motor current initial value based on the motor current initial average value of the motor; and
  store the determined motor current initial value; and
as a subsequent process after the initial process and after a predetermined period of the operation process:
  measure, in response to causing the specified process gas type or the process gas in the specified flow rate to flow into the exhaust pump, the motor current value of the motor;
  read, using the motor driver of the deposition detection device, the motor current value of the motor a plurality of times when the specified process gas type or the process gas in the specified flow rate is flowed into the exhaust pump;
  calculate a motor current present average value of the motor based on the read motor current value of the motor;
  determine a motor current present value based on the motor current present average value of the motor; and
  determine an amount of change between the motor current present value and the motor current initial value, wherein the amount of change is due to an increase in gas pressure due to a deposition in the exhaust pump,
wherein the deposition detection device detects the deposition in the exhaust pump based on the amount of change after the operation of the exhaust pump for the predetermined period.

2. The deposition detection device for an exhaust pump according to claim 1, wherein the deposition detection device is further configured to generate a warning based on the amount of change.

3. The deposition detection device for an exhaust pump according to claim 2, wherein a level of the warning is set in stages based on the amount of change.

4. The deposition detection device for an exhaust pump according to claim 1, wherein the deposition detection device is further configured to, in the subsequent process:
  measure a temperature of the motor at a stage where the motor current value of the motor is read,
  predict a motor current attained value based on the measured temperature of the motor, and
  adopt the predicted motor current attained value as the motor current present value.

5. The deposition detection device for an exhaust pump according to claim 1, wherein the deposition detection device is further configured to, in the initial process, measure a temperature of the motor at a stage where the motor current value of the motor is read, predict a motor current attained value based on the measured temperature of the motor, and adopt and store the predicted motor current attained value as the motor current initial value.

6. The deposition detection device for an exhaust pump according to claim 1, wherein the deposition detection device is further configured to estimate a thickness of the deposition based on the amount of change.

7. A deposition detection device for an exhaust pump for exhausting gas by a rotational movement of a rotating body, the deposition detection device comprising a temperature sensor, the deposition detection device configured to:
as an initial process before an operation process of the exhaust pump:
  measure, in response to causing a specified process gas type which is different than a gas type of the operation process to flow into the exhaust pump or causing a process gas in a specified flow rate which is different than a flow rate of the operation process to flow into the exhaust pump, a temperature of the rotating body;
  read, using the temperature sensor of the deposition detection device, the temperature of the rotating body a plurality of times when the specified process gas type or the process gas in the specified flow rate is flowed into the exhaust pump;

calculate an initial average temperature of the rotating body based on the read temperature of the rotating body;

determine a rotating body temperature initial value based on the initial average temperature of the rotating body; and store the determined rotating body temperature initial value; and as a subsequent process after the initial process and after a predetermined period of the operation process:

measure, in response to causing the specified process gas type or the process gas in the specified flow rate to flow into the exhaust pump, the temperature of the rotating body;

read, using the temperature sensor of the deposition detection device, the temperature of the rotating body a plurality of times when the specified process gas type or the process gas in the specified flow rate is flowed into the exhaust pump;

calculate a present average temperature of the rotating body based on the read temperature of the rotating body;

determine a rotating body temperature present value based on the present average temperature of the rotating body; and determine an amount of change between the rotating body temperature present value and the rotating body temperature initial value, wherein the amount of change is due to an increase in a deposition thickness of a deposition in the exhaust pump, wherein the deposition detection device detects the deposition in the exhaust pump based on the amount of change after the operation of the exhaust pump for the predetermined period.

8. The deposition detection device for an exhaust pump according to claim 7, wherein the deposition detection device is further configured to generate a warning based on the amount of change.

9. The deposition detection device for an exhaust pump according to claim 8, wherein a level of the warning is set in stages based on the amount of change.

10. The deposition detection device for an exhaust pump according to claim 7, wherein the deposition detection device is further configured to estimate the deposition thickness based on the amount of change.

11. A deposition detection device for an exhaust pump for exhausting gas by a rotational movement of a rotating body driven by a motor, the deposition detection device comprising a motor driver and a temperature sensor, the deposition detection device configured to:

as an initial process before an operation process of the exhaust pump:

measure, in response to causing a specified process gas type which is different than a gas type of the operation process to flow into the exhaust pump or causing a process gas in a specified flow rate which is different than a flow rate of the operation process to flow into the exhaust pump, a motor current value of the motor and a temperature of the rotating body, wherein at least one of the specified process gas type or the specified flow rate is configured to stabilize the motor current value;

read, using the motor driver of the deposition detection device, the motor current value of the motor a plurality of times when the specified process gas type or the process gas in the specified flow rate is flowed into the exhaust pump;

calculate a motor current initial average value of the motor based on the read motor current value of the motor;

determine a motor current initial value based on the motor current initial average value of the motor;

store the determined motor current initial value;

read, using the temperature sensor of the deposition detection device, the temperature of the rotating body a plurality of times when the specified process gas type or the process gas in the specified flow rate is flowed into the exhaust pump;

calculate an initial average temperature of the rotating body based on the read temperature of the rotating body;

determine a rotating body temperature initial value based on the initial average temperature of the rotating body; and store the determined rotating body temperature initial value; and as a subsequent process after the initial process and after a predetermined period of the operation process:

measure, in response to causing the specified process gas type or the process gas in the specified flow rate to flow into the exhaust pump, the motor current value of the motor and the temperature of the rotating body;

read, using the motor driver of the deposition detection device, the motor current value of the motor a plurality of times when the specified process gas type or the process gas in the specified flow rate is flowed into the exhaust pump;

calculate a motor current present average value of the motor based on the read motor current value of the motor;

determine a motor current present value based on the motor current present average value of the motor;

determine an amount of change between the motor current present value and the motor current initial value, wherein the amount of change is due to an increase in gas pressure due to a deposition in the exhaust pump;

read, using the temperature sensor of the deposition detection device, the temperature of the rotating body a plurality of times when the specified process gas type or the process gas in the specified flow rate is flowed into the exhaust pump;

calculate a present average temperature of the rotating body based on the read temperature of the rotating body;

determine a rotating body temperature present value based on the present average temperature of rotating body; and determine an amount of change between the rotating body temperature present value and the rotating body temperature initial value, wherein the amount of change is due to an increase in a deposition thickness of the deposition in the exhaust pump, wherein the deposition detection device detects the deposition in the exhaust pump based on the two amounts of change after the operation of the exhaust pump for the predetermined period.

12. The deposition detection device for an exhaust pump according to claim 11, wherein the deposition detection device is further configured to generate a warning based on the two amounts of change.

13. The deposition detection device for an exhaust pump according to claim 12, wherein a level of the warning is set in stages based on the two amounts of change.

14. The deposition detection device for an exhaust pump according to claim 13, wherein
when the amount of change between the motor current present value and the motor current initial value is not less than a current-related maximum warning setting threshold or when the amount of change between the rotating body temperature present value and the rotating body temperature initial value is not less than a temperature-related maximum warning setting threshold, the deposition detection device is configured to generate the warning corresponding to each of the thresholds, and
when the amount of change between the motor current present value and the motor current initial value is not less than a current-related initial warning setting threshold and when the amount of change between the rotating body temperature present value and the rotating body temperature initial value is not less than a temperature-related initial warning setting threshold, the deposition detection device is configured to generate the warning corresponding to the current-related or temperature-related initial warning setting threshold.

15. The deposition detection device for an exhaust pump according to claim 11, wherein, in the subsequent process, the deposition detection device is configured to measure a temperature of the motor at a stage where the motor current value of the motor is read, predict a motor current attained value based on the measured temperature of the motor, and adopt the predicted motor current attained value as the motor current present value.

16. The deposition detection device for an exhaust pump according to claim 11, wherein, in the initial process, the deposition detection device is configured to measure a temperature of the motor at a stage where the motor current value of the motor is read, predict a motor current attained value based on the measured temperature of the motor, and adopt and store the predicted motor current attained value as the motor current initial value.

17. An exhaust pump comprising the deposition detection device according to any one of claims 1 to 16.

18. The deposition detection device for an exhaust pump according to claim 11, wherein the deposition detection device is further configured to estimate the deposition thickness based on the amounts of change.

* * * * *